3,482,011
PROCESS FOR PRODUCING WATER-SOLUBLE CELLULOSE ACETATE FIBERS
Thomas C. Bohrer, Madison, N.J., assignor to Celanese Corporation, New York, N.Y., a corporation of Delaware
No Drawing. Filed Dec. 2, 1965, Ser. No. 511,240
Int. Cl. D01f *3/36;* C08b *21/04;* C08h *17/34*
U.S. Cl. 264—207                                     5 Claims

ABSTRACT OF THE DISCLOSURE

Cellulose acetate fibers which are soluble in water at room temperature, having an acetyl value of 20–25%, an inherent viscosity as regenerated cellulose of at least 1, a tenacity of at least 1.0 g./d. and an elongation of at least 20% at 65% relative humidity, prepared by a process comprising dissolving water-soluble cellulose acetate having an acetyl value of from about 20 to 25 percent and an inherent viscosity as regenerated cellulose of at least 1, in a solvent comprising water-water miscible ketones wherein the solvent has a water to organic solvent ratio within the range of from 1:1 to 6:1 by volume, and extruding the solution formed into an evaporative atmosphere.

---

This invention relates to the production of cellulose acetate fibers which are soluble in water at room temperature.

Products in which partial or total dissolution of a fiber in aqueous systems is desirable include separation threads for circular knit and tire cord fabrics, scaffolding thread in manufacture of socks, non-puckering thread for crease-fast clothes, disposable parachutes for military purposes, lace embroidery fabrics, and medical sutures. In general water-soluble fibers are particularly suited to applications where only temporary bonding or support is desired.

Water-soluble fibers are presently known and include sodium alginate and polyvinyl alcohol fibers. However their higher cost has limited their use. Moreover sodium alginate fibers are soluble only in alkaline solution and polyvinyl alcohol fibers are not soluble under stress.

It is an object of this invention to find an alternative water-soluble fiber which is relatively inexpensive, soluble in water at pH 7 and is soluble even under stress. It is now being discovered that water-soluble cellulose acetate can be formed into such fibers.

It is a further object of this invention to produce novel inexpensive water-soluble cellulose acetate fibers having properties suitable for textile application. A satisfactory method for spinning water-soluble cellulose acetate into such fibers has not previously been known.

It has now been discovered that in order to obtain water-soluble cellulose acetate having satisfactory fiber properties the choice of crude water-soluble cellulose acetate of high inherent viscosity, and the proper solvent for the spinning solution, are critical.

According to the present invention the starting material water-soluble cellulose acetate should have an acetyl value in the range of about 17 to 27% calculated as combined acetic acid by weight and preferably about 20 to 25%. Water-soluble cellulose acetate can be prepared by esterification followed by hydrolysis. It is a further critical parameter that the cellulose regenerated from said water-soluble cellulose acetate by conventional hydrolysis have an inherent viscosity of at least about 1.0, and preferably 1.5. Suitable high viscosity water-soluble cellulose acetate may be prepared by the sulfuric acid catalyzed hydrolysis at 39–41° C. of secondary cellulose acetate or cellulose triacetate of correspondingly high viscosity.

Water-soluble cellulose acetate prepared by the acetic acid catalyzed hydrolysis at high temperature (60–90° C.) exhibits too low an inherent viscosity (of the regenerated cellulose) to yield fibers with satisfactory properties.

The nature of the solvent employed for producing dopes is quite significant for successful practice of the invention. To convert water-soluble cellulose acetate to fibers one might have thought that water was an ideal solvent. However, one cannot so produce these fibers since, inter alia, the solutions which can be prepared at low temperatures (below 60° C.) are not sufficiently viscous at temperatures necessary to spin from 100% water (100° C.) to permit a continuous spinning operation without excessive interruptions.

I have also discovered suitable solvents and solvent mixtures from which the high inherent viscosity cellulose acetate can be spun into acceptable water-soluble fibers. They include water miscible ketones admixed with water, dimethylformamide, dimethylacetamide, dimethyl sulfoxide, water-methanol, tetrahydrofuran, tetrahydrofuran-water and water-acetic acid. The preferred solvent is water-acetone in a ratio of water to acetone from about 1:1 to 6:1 by volume.

The optimum solvent is a function of the specific water-soluble cellulose acetate starting material. Using a water-acetone solvent, the preferred ratio when the water-soluble cellulose acetate starting material has an acetyl value of 25 is a ratio of water to acetone of 2:1 by volume. When said acetyl value is 20, a 5:1 water:acetone ratio is preferred.

During the preparation of the solution mixing should be continuous since, if mixing is stopped, the viscosity will rise rapidly. After preparation, the solution is extruded into an evaporative atmosphere in the conventional manner.

Fibers produced by the method of the present invention using a water-soluble cellulose acetate starting material having an inherent viscosity (as regenerated cellulose) of at least 1.3 exhibit a tenacity from 1.0 to 1.5 grams per denier and an elongation ranging from 20 to 28% at 65% relative humidity.

The invention will now be further described in the following illustrative examples wherein all parts are by weight unless otherwise specified.

EXAMPLE I

Water-soluble cellulose acetate having an acetyl value of 24.8% and an inherent viscosity (of the regenerated cellulose) of 1.33 is prepared by the sulfuric acid catalyzed hydrolysis of secondary cellulose acetate by heating at 40° C. for 60 hours.

A 17.1% solution of this water-soluble cellulose acetate dissolved in a 2:1 by volume water:acetone solvent is prepared while continuously mixing. This solution is conveyed at room temperature to a heated jet having 10-holes of 44μ diameter and is dry spun into a heated downdraft column having a temperature at the top of 110° C. and at the bottom of 250° C. The filaments are collected at 120 meters per minute and have the following range of properties when tested at 65% relative humidity:

Denier per filament _____ 4.5–6.8
Tenacity, grams per denier _____ 1.28–1.52
Elongation, % _____ 23.1–27.3
Initial modulus, grams per denier _____ 41.8–51.4

The fibers exhibit excellent solubility in 25° C. water.

EXAMPLE II

Example I is repeated using a pure water solution instead of a water-acetone solution. Spinning is unstable.

EXAMPLE III

A polymer solution is similarly prepared using a water soluble cellulose acetate having an acetyl value of 23.4% and an inherent viscosity of 1.39 dissolved in a 5:1 volume water/acetone solvent. The solution has a solids concentration of 20% and a viscosity of 25° C. of 1500 poises. The solution is conveyed at room temperature to the heated jet with a jet face temperature of 70° C. and is spun into a heated downdraft column having a temperature at the top of 130° C. and at the bottom of 100° C. at a spinning speed of 75 m./min. The collected fibers are dog-bone shaped indicating slow drying. The fiber is bright and clear, and is water-soluble, both relaxed and under stress. Tensile properties at 50% relative humidity are 1.15 grams per denier tenacity and 25.7% elongation. Similarly results are achieved at a spinning speed of 150 m./min.

EXAMPLE IV

Example III is repeated using a low viscosity water-soluble cellulose acetate prepared by the acetic-acid catalyzed hydrolysis of cellulose triacetate and having an acetyl value of 21.9%, and an inherent viscosity of the regenerated cellulose of 0.47. The fiber produced is brittle. Tensile properties at 50% and 65% relative humidity average 6.8% elongation and 0.54% grams per denier tenacity.

Examples I and III are merely exemplary of the process and products of this invention and many other variants thereof will thereupon be obvious to one skilled in the art within the spirit of the present invention.

What is claimed is:

1. A process for preparing water-soluble cellulose acetate filaments comprising dissolving water-soluble cellulose acetate having an acetyl value within the range of from about 20 to 25 percent and an inherent viscosity as regenerated cellulose of at least 1 in a solvent comprising water-water miscible ketones, wherein the solvent has a water to organic solvent ratio within the range of from 1:1 to 6:1 by volume, and extruding the solution so formed into an evaporative atmosphere.

2. A process according to claim 1 wherein said inherent viscosity is within the range of 1.3 to 1.5.

3. A process according to claim 1 wherein the solvent is water-acetone present in a ratio of from 1 to 6 times as much water by volume as acetone.

4. A process according to claim 3 wherein the water-soluble cellulose acetate starting material is produced by the sulfuric acid catalyzed hydrolysis of cellulose secondary acetate at 39 to 41 degrees centigrade.

5. A process according to claim 3 wherein said inherent viscosity is within the range of 1.3 to 1.5.

References Cited

UNITED STATES PATENTS

| | | | |
|---|---|---|---|
| 2,129,052 | 9/1938 | Fordyce | 106—196 |
| 2,327,770 | 8/1943 | Crane | 106—196 |
| 3,037,902 | 6/1962 | Fahey et al. | 260—227 |

FOREIGN PATENTS

| | | |
|---|---|---|
| 333,926 | 8/1930 | Great Britain. |

ALLAN LIEBERMANN, Primary Examiner

U.S. Cl. X.R.

106—170, 176, 186, 196; 260—227